United States Patent
Kawai

(10) Patent No.: US 12,497,333 B2
(45) Date of Patent: Dec. 16, 2025

(54) ZIRCONIA SINTERED BODY AND PRODUCTION METHOD FOR THE SAME

(71) Applicant: KCM CORPORATION, Nagoya (JP)

(72) Inventor: Akira Kawai, Nagoya (JP)

(73) Assignee: KCM Corporation, Nagoya (JP)

( * ) Notice: Subject to any disclaimer, the term of this patent is extended or adjusted under 35 U.S.C. 154(b) by 0 days.

(21) Appl. No.: 18/869,069

(22) PCT Filed: Jun. 6, 2023

(86) PCT No.: PCT/JP2023/020999
§ 371 (c)(1),
(2) Date: Nov. 25, 2024

(87) PCT Pub. No.: WO2023/238861
PCT Pub. Date: Dec. 14, 2023

(65) Prior Publication Data
US 2025/0171363 A1    May 29, 2025

(30) Foreign Application Priority Data

Jun. 10, 2022 (JP) .................................. 2022-094106
Mar. 2, 2023 (JP) .................................. 2023-031663

(51) Int. Cl.
C04B 35/488    (2006.01)
A61K 6/818    (2020.01)
C04B 35/64    (2006.01)

(52) U.S. Cl.
CPC ............ C04B 35/488 (2013.01); A61K 6/818 (2020.01); C04B 35/64 (2013.01); C04B 2235/3246 (2013.01); C04B 2235/667 (2013.01)

(58) Field of Classification Search
CPC ...... C04B 35/48–493; C04B 2235/667; C04B 2235/3246
See application file for complete search history.

(56) References Cited

U.S. PATENT DOCUMENTS

2002/0031675 A1    3/2002  Cales et al.
2006/0191916 A1    8/2006  Stephan et al.
(Continued)

FOREIGN PATENT DOCUMENTS

CN    113831144 A  * 12/2021  ............ C04B 35/48
JP    H08-34612 A    2/1996
(Continued)

OTHER PUBLICATIONS

KCM Corporation. (no date). "Company history". Retrieved May 21, 2025, from <https://www.kyoritsu-kcm.co.jp/english/company/history.php>. (Year: 2025).*
(Continued)

*Primary Examiner* — Erin Snelting
(74) *Attorney, Agent, or Firm* — Oliff PLC

(57) ABSTRACT

A zirconia sintered body with excellent translucency and hydrothermal degradation resistance is provided. A production method for a zirconia sintered body that is to be disclosed herein includes a process body preparing step of preparing a process body containing zirconia and yttria and/or ytterbia, in which a total proportion of the yttria and the ytterbia is 4 mol % or more and 6 mol % or less when a total of the zirconia, the yttria, and the ytterbia is set to 100 mol %, a first heating step of heating the process body at 800° C. or higher and 1200° C. or lower, a second heating step of heating the process body after the first heating step at 1600° C. or higher and 2000° C. or lower by microwave heating, and a cooling step of decreasing a temperature of the process body after the second heating step to 1300° C. at a rate of 50° C./min or more.

4 Claims, 4 Drawing Sheets

(56) References Cited

U.S. PATENT DOCUMENTS

| | | | |
|---|---|---|---|
| 2007/0023971 | A1 | 2/2007 | Saha et al. |
| 2009/0079101 | A1* | 3/2009 | Laubersheimer .. A61C 13/0006 264/16 |
| 2016/0095798 | A1 | 4/2016 | Brodkin et al. |
| 2016/0310245 | A1 | 10/2016 | Fujisaki et al. |
| 2020/0170765 | A1* | 6/2020 | Rothbrust ............ A61C 13/083 |
| 2021/0101838 | A1 | 4/2021 | Ito et al. |
| 2022/0135486 | A1 | 5/2022 | Kudo et al. |
| 2023/0382808 | A1 | 11/2023 | Matsuura |

FOREIGN PATENT DOCUMENTS

| | | |
|---|---|---|
| JP | 2003-530970 A | 10/2003 |
| JP | 2006-513963 A | 4/2006 |
| JP | 2011-178610 A | 9/2011 |
| JP | 2014-012627 A | 1/2014 |
| JP | 2014-218421 A | 11/2014 |
| JP | 2018-12609 A | 1/2018 |
| JP | 2018-052806 A | 4/2018 |
| JP | 2019-5627 A | 1/2019 |
| JP | 2021-059489 A | 4/2021 |
| WO | 2020/179877 A1 | 9/2020 |
| WO | 2022/065452 A1 | 3/2022 |

OTHER PUBLICATIONS

Kuraray Noritake Dental Inc. (no date). "About Kuraray Noritake Dental Inc.". Retrieved May 21, 2025, from <https://www.kuraraynoritake/eu/uk/about>. (Year: 2025).*

CN-113831144-A (Xu, Chen) Dec. 24, 2021 (English language translation). [online] [retrieved Sep. 2, 2025]. Retrieved from: Clarivate Analytics. (Year: 2021).*

Matsui et al, "Development of tetragonal Zirconia Polycrystal Ceramics", Journal of the Ceramic Society of Japan, vol. 45, Sep. 2010, p. 758.

Yamakin Co., Ltd., Zirconia Basics and Product Reports, Feb. 21, 2024.

Translation of Dec. 19, 2024 International Preliminary Report on Patentability issued in International Application No. PCT/JP2023/020999.

May 23, 2024 Office Action issued in Japanese Application No. 2024-524565.

Jun. 27, 2024 Notice of Allowance issued in Japanese Patent Application No. 2024-524565.

Aug. 1, 2023 International Search Report issued in International Patent Application No. PCT/JP2023/020999.

* cited by examiner

ZIRCONIA SINTERED BODY AND PRODUCTION METHOD FOR THE SAME

TECHNICAL FIELD

The present invention relates to a zirconia sintered body and a production method for the same. The present application claims priority based on Japanese Patent Application No. 2022-094106, filed on Jun. 10, 2022, and Japanese Patent Application No. 2023-031663, filed on Mar. 2, 2023, the contents of which are incorporated herein by reference.

BACKGROUND ART

Zirconia sintered bodies in which a solid solution of a small amount of yttria ($Y_2O_3$) has been formed (hereinafter, also referred to as "partially stabilized zirconia sintered bodies" in some cases) are in wide use as biomaterials such as dental materials (for example, dentures, dental prosthetics, denture mill blank, and orthodontic brackets) due to their high strength, toughness, and aesthetics. For example, Patent Literature 1 discloses a translucent zirconia sintered body containing more than 4.0 mol % and 6.5 mol % or less of yttria and less than 0.1 wt % of alumina. This zirconia sintered body has a high sintered body density and excellent translucency and is thus considered to have both translucency and strength particularly suitable for dentures for front teeth.

In addition, Patent Literatures 2 and 3 disclose a zirconia sintered body having excellent hydrothermal degradation resistance by setting the sintering temperature of the zirconia sintered body to at least 1350° C. or lower.

CITATION LIST

Patent Literatures

[Patent Literature 1] Japanese Unexamined Patent Application Publication No. 2015-143178
[Patent Literature 2] Japanese Unexamined Patent Application Publication No. 2014-12627
[Patent Literature 3] Japanese Unexamined Patent Application Publication No. 2014-218421

SUMMARY OF INVENTION

Technical Problem

Incidentally, for example, in the case of using the zirconia sintered body as the dental material, it is preferable to achieve both excellent translucency and excellent hydrothermal degradation resistance. In the technique according to Patent Literature 1, since monoclinic crystals remain in the zirconia sintered body, there can be room for further improvement of the hydrothermal degradation resistance. In the techniques according to Patent Literatures 2 and 3, there can be room for further improvement of the translucency.

The present invention has been made in view of the above circumstances, and a main object thereof is to provide a zirconia sintered body with excellent translucency and excellent hydrothermal degradation resistance. It is another object to provide a method for producing such a zirconia sintered body.

Solution to Problem

In order to achieve the above objects, the present inventor has made examinations, and thus found out that a zirconia sintered body with excellent translucency and excellent hydrothermal degradation resistance can be achieved when a process body (also referred to as "compact" or "work") containing partially stabilized zirconia including a predetermined proportion of yttria and/or ytterbia ($Yb_2O_3$) is sintered by microwave heating and then cooled rapidly to 1300° C. An analysis of a crystal phase of the obtained zirconia sintered body indicates that the proportion of a crystal phase in which a c/a axis length ratio of a unit lattice is 1.0055 or more and less than 1.010 is improved.

One aspect of a production method for a zirconia sintered body that is to be disclosed herein includes: a process body preparing step of preparing a process body containing zirconia and yttria and/or ytterbia, in which a total proportion of the yttria and the ytterbia is 4 mol % or more and 6 mol % or less when a total of the zirconia, the yttria, and the ytterbia is set to 100 mol %; a first heating step of heating the process body at 800° C. or higher and 1200° C. or lower; a second heating step of heating the process body after the first heating step at 1600° C. or higher and 2000° C. or lower by microwave heating; and a cooling step of decreasing a temperature of the process body after the second heating step to 1300° C. at a rate of 50° C./min or more. By such a production method, a zirconia sintered body with excellent translucency and hydrothermal degradation resistance can be produced.

In one preferable aspect of the production method that is to be disclosed herein, a heating method of the microwave heating is a multimode. This makes it possible to heat the process body while suppressing the generation of plasma. As a result, the occurrence of cracking in the zirconia sintered body is suppressed, and a zirconia sintered body having higher translucency and hydrothermal degradation resistance can be produced.

In one preferable aspect of the production method that is to be disclosed herein, in the second heating step, the microwave heating is performed in an oxidative atmosphere. This makes it possible to suppress the zirconia sintered body getting dark, and accordingly, a zirconia sintered body having excellent translucency and hydrothermal degradation resistance and additionally having excellent aesthetics can be produced.

In one preferable aspect of the production method that is to be disclosed herein, in the second heating step, the microwave heating is performed in an atmosphere where an oxygen concentration is 30 vol % or more and 100 vol % or less. This makes it possible to effectively suppress the zirconia sintered body getting dark, and a zirconia sintered body having superior aesthetics and excellent translucency and hydrothermal degradation resistance can be thus produced.

In one preferable aspect of the production method that is to be disclosed herein, in the second heating step, SiC susceptors are disposed so as to sandwich the process body from both sides in a predetermined direction. This makes it possible to advance the sintering inside the process body more suitably, and a zirconia sintered body having superior translucency and hydrothermal degradation resistance can be thus produced.

In one preferable aspect of the production method that is to be disclosed herein, the zirconia contains granular particles. This improves the shape stability and accordingly, handleability or workability can improve.

In addition, the present disclosure provides a zirconia sintered body. This zirconia sintered body can be produced by any of the above-described production methods, for example. The zirconia sintered body that is to be disclosed herein contains zirconia, yttria, and ytterbia, in which a total proportion of the yttria and the ytterbia is 4 mol % or more and 6 mol % or less when a total of the zirconia, the yttria, and the ytterbia is set to 100 mol %, and a coefficient of variation in characteristic X-ray intensity of the yttrium or the ytterbium measured by line analysis using EPMA is 0.04 or less. With such a structure, the excellent translucency and hydrothermal degradation resistance can be achieved.

In one preferable aspect of the zirconia sintered body that is to be disclosed herein, a proportion of a crystal phase in which a c/a axis length ratio of a unit lattice is 1.0055 or more and less than 1.010 is 40 mass % or more when the entire crystal phase is set to 100 mass %. Thus, the translucency and the hydrothermal degradation resistance improve.

Note that in this specification, the c/a axis length ratio of the unit lattice in the zirconia sintered body and the proportion thereof can be obtained in such a way that a profile of an X-ray diffraction pattern of the zirconia sintered body is subjected to Rietveld analysis using RIETAN-FP as an analysis program.

In one preferable aspect of the zirconia sintered body that is to be disclosed herein, a total light transmittance to a D65 light source in a thickness direction of a test piece with a thickness of 1 mm is 40% or more. Thus, the zirconia sintered body with high aesthetics is achieved.

In one preferable aspect of the zirconia sintered body that is to be disclosed herein, a proportion of monoclinic crystal after immersion in hot water of 140° C. for 100 hours is 10% or less. The zirconia sintered body that is to be disclosed herein can have such excellent hydrothermal degradation resistance.

In one preferable aspect of the zirconia sintered body that is to be disclosed herein, a proportion of a crystal phase in which a c/a axis length ratio of a unit lattice is 1 or more and less than 1.0055 is 25 mass % or less when the entire crystal phase is set to 100 mass %. Since such a structure can make the crystal phase more homogeneous, the superior translucency and hydrothermal degradation resistance can be achieved.

One preferable aspect of the zirconia sintered body that is to be disclosed herein further contains alumina, in which a proportion of the alumina is 0.15 mass % or less when the entire zirconia sintered body is set to 100 mass %. This suppresses abnormal grain growth during zirconia sintering, and the translucency and the hydrothermal degradation resistance can improve.

In addition, the present disclosure provides a dental material containing the zirconia sintered body that is to be disclosed herein. In one preferable aspect of the dental material that is to be disclosed herein, the dental material is a denture, a denture mill blank, or an orthodontic bracket. The zirconia sintered body that is to be disclosed herein has the excellent translucency and hydrothermal degradation resistance and thus can be suitably used as the dental material.

DESCRIPTION OF EMBODIMENTS

Figure 1:
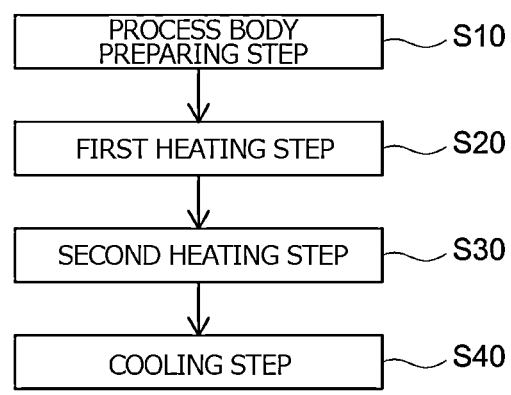
FIG. 1 is a flowchart showing the outline of one aspect of a production method for a zirconia sintered body that is to be disclosed herein.

Hereinafter, a preferable embodiment of a technique that is to be disclosed herein will be described. Matters that are other than matters particularly mentioned in the present specification (for example, the temperature of microwave heating) and that are necessary for the implementation of the present technique can be understood based on technical contents that are taught by the present specification and general technical common senses of those who are skilled in the related technique. The contents of the technique that is to be disclosed herein can be carried out based on the contents that are to be disclosed in the present specification and technical common senses in the related technique. In the present specification, the numerical range "A to B (here, A and B are arbitrary numerals)" means "A or more and B or less" and also encompasses the meaning "more than A and less than B", "more than A and B or less", and "A or more and less than B".

A zirconia sintered body that is to be disclosed herein contains at least zirconia ($ZrO_2$). Moreover, this zirconia sintered body contains at least one of yttria ($Y_2O_3$) and ytterbia ($Yb_2O_3$). That is, the zirconia sintered body that is to be disclosed herein has an aspect where both yttria and ytterbia are contained, an aspect where yttria is contained, but ytterbia is not contained and an aspect where ytterbia is contained, but yttria is not contained. The zirconia sintered body contains zirconia as a main component. Here, "containing zirconia as a main component" means that, among compounds that configure the zirconia sintered body, the proportion of zirconia is largest. When the entire zirconia sintered body is set to 100 mass %, the proportion of zirconia is, for example, 70 mass % or more, and is preferably 80 mass % or more and more preferably 90 mass % or more. When the proportion of zirconia is high, the strength, toughness, hydrothermal degradation resistance, and the like of the zirconia sintered body can improve.

Yttria and/or ytterbia that is contained in the zirconia sintered body can typically be contained as a part of partially stabilized zirconia that partially forms a solid solution in zirconia (so-called stabilizer), for example. In the partially stabilized zirconia, the proportion of monoclinic crystals is suppressed at room temperature; therefore, the strength and the toughness can improve. In addition, since the proportion of monoclinic crystals is suppressed, a variation in crystal phase that configures the zirconia sintered body is suppressed, so that the translucency can improve.

When the total of zirconia, yttria, and ytterbia contained in the zirconia sintered body is set to 100 mol %, the total proportion of yttria and ytterbia (in other words, the total of stabilizer, and in the aspect not containing yttria or ytterbia, the element that is not contained is 0 mol %, which applies similarly to the description below) is, for example, 4 mol % or more and can be 4.1 mol % or more. Moreover, the total proportion of yttria and/or ytterbia is, for example, 6 mol % or less and can be 5.6 mol % or less. In the case where the zirconia sintered body contains both yttria and ytterbium, the proportion of yttria may be larger than that of ytterbia and the proportion of yttria may be smaller than that of ytterbia.

Yttria and/or ytterbia may all form a solid solution in zirconia or may include yttria and/or ytterbia in a non-solid solution state, which does not form any solid solutions in zirconia.

The zirconia sintered body can further contain alumina ($Al_2O_3$). In the zirconia sintered body containing alumina, since abnormal grain growth is suppressed, it is possible to improve the strength and translucency of the zirconia sintered body. In addition, since the low-temperature deterioration resistance can improve, it is possible to maintain the strength and translucency of the zirconia sintered body over a long period of time. Incidentally, alumina remains in the sintered body as an impurity and acts as a light scattering factor, and the alumina content is preferably not too high. Therefore, the content of alumina needs to be, for example, 0.15 mass % or less, and can be 0.125 mass % or less, 0.1 mass % or less, or 0.05 mass % or less when the entire zirconia sintered body is set to 100 mass %.

In addition, the zirconia sintered body can contain a conventionally well-known colorant to an extent that the effect of the technique that is to be disclosed herein is not significantly impaired. Examples of the colorant include transition metal elements, lanthanide rare earth elements and the like. Examples of such elements include iron, nickel, cobalt, manganese, niobium, praseodymium, neodymium, europium, gadolinium, erbium and the like. The amount of the colorant needs to be, for example, 2 mass % or less of the entire zirconia sintered body and can be 1 mass % or less or 0.5 mass % or less.

In addition, the zirconia sintered body may contain an element that can be inevitably incorporated. Examples thereof include hafnium, magnesium, silicon, titanium and the like. The total content of these elements is preferably 2.5 mass % or less, more preferably 2 mass % or less and may be, for example, 1.8 mass % or less in terms of the oxide relative to the entire zirconia sintered body.

FIG. 1 is a flowchart showing the outline of one aspect of a production method for a zirconia sintered body that is to be disclosed herein. The production method for a zirconia sintered body that is to be disclosed herein can include a process body preparing step S10 of preparing a process body containing zirconia and yttria and/or ytterbia, a first heating step S20 of heating the process body, a second heating step S30 of heating the process body after the first heating step S20 (this process body is hereinafter also referred to as "calcined body") by microwave heating, and a cooling step S40 of decreasing the temperature of the process body after the second heating step.

<Process Body Preparing Step S10>

The process body preparing step S10 can include the preparation of a material that configures the process body (hereinafter, this material is also referred to as "process body material") (hereinafter, this step is also referred to as "process body material preparing step") and the forming of the process body material (hereinafter, also referred to as "forming step").

In the process body material preparing step, first, a zirconia raw material is prepared. The zirconia raw material is not particularly limited, and, for example, a zirconia salt or a hydrate thereof can be used. Examples of the zirconia salt include zirconium oxychloride, zirconium chloride, zirconium sulfate, zirconium nitrate and the like. These may be used singly or two or more thereof may be jointly used.

Next, an aqueous solution of the zirconia raw material is prepared, and a hydrolysis reaction is performed, thereby preparing a zirconia sol. The hydrolysis reaction can be performed by adding an alkali metal hydroxide, an alkaline earth metal hydroxide, an ammonia aqueous solution or the like to such an aqueous solution. As the alkali metal hydroxide, for example, lithium hydroxide, sodium hydroxide, potassium hydroxide or the like can be used, and, as the alkaline earth metal hydroxide, for example, magnesium hydroxide, calcium hydroxide or the like can be used.

Next, yttria and/or ytterbia or a raw material thereof is mixed with the zirconia sol obtained by the hydrolysis ($ZrO_2 \cdot nH_2O$). The raw material of yttria is an yttrium-containing compound that can turn into yttria by firing. As the yttrium-containing compound, yttrium chloride, yttrium nitrate and the like are exemplified. The raw material of ytterbia may be an ytterbium-containing compound that can turn into ytterbia by firing. As the ytterbium-containing compound, ytterbium chloride, ytterbium nitrate and the like are exemplified.

In the case of adding yttria and/or ytterbia to the zirconia sol, the proportion of yttria and/or ytterbia to be mixed may be similar to the proportion of yttria and/or ytterbia in the above-described zirconia sintered body. When the total of zirconia that is contained in the zirconia sol and yttria and ytterbia to be mixed is set to 100 mol %, the total proportion of yttria and ytterbia is, for example, 4 mol % or more and may be 4.1 mol % or more. The upper limit of the total proportion of yttria and ytterbia is, for example, 6 mol % or less and may be 5.6 mol % or less.

In addition, in the case of mixing the yttria raw material and/or the ytterbia raw material into the zirconia sol, the amount of yttria and/or ytterbia that can be obtained by firing these raw materials needs to be within the above-described range of the proportion of yttria and/or ytterbia. For example, in the case of using X mol (X is a positive number) of yttrium chloride ($YCl_3$) as the yttria raw material, 0.5X mol of yttria ($Y_2O_3$) can be obtained; therefore, yttrium chloride needs to be mixed so that the amount of substance doubles compared with that in a case where yttria itself is mixed.

Next, the zirconia sol to which yttria and/or ytterbia or the raw material thereof has been added is dried, whereby it is possible to obtain a dry powder in which each raw material has been homogeneously dispersed. A drying method is not particularly limited, and, for example, natural drying, blast drying, hot air drying, drying by heating using a heating furnace or the like, vacuum drying, suction drying, freeze drying or the like can be appropriately selected.

The powder obtained by drying is calcined, whereby a calcined powder containing yttria and/or ytterbia partially stabilized zirconia can be obtained. The calcination temperature is not particularly limited, but can be set to 800° C. to 1200° C., preferably 1000° C. to 1200° C., for example. Due to such calcination, the yttria raw material can be oxidized into yttria, and the ytterbia raw material can be oxidized into ytterbia. As a heating device for the calcination, a conventionally well-known heating device can be used, and examples of the heating device include an electric furnace, a muffle furnace, a tunnel-type heating furnace, a microwave firing furnace and the like.

A calcined powder contains particles having a variety of shapes and particle diameters and is thus preferably crushed. A crushing method is not particularly limited, and the calcined powder can be crushed with, for example, a well-known crushing device (for example, a ball mill or the like). In the ball mill, zirconia balls having a diameter of approximately 0.1 mm to 5 mm are preferably used, for example.

In addition, the crushed powder is preferably sorted into a desired particle diameter. For example, a zirconia powder having a desired particle diameter can be obtained with a mesh sieve, and the size of the mesh opening may be selected as appropriate in accordance with a desired particle diameter.

The average particle diameter of the zirconia powder that is used as the process body material is, for example, preferably 100 nm to 300 nm and more preferably 150 nm to 200 nm. When the average particle diameter is within such a range, the sinterability is high, and the strength and the translucency can improve. In the present specification, "average particle diameter" refers to a particle diameter (D50) corresponding to the cumulative frequency of 50% from the fine particle side in a volume-based particle size distribution measured by the laser diffraction scattering method. In such measurement, for example, a particle size analyzer LA950V2 (manufactured by Horiba, Ltd.) can be used.

The zirconia powder produced as described above mainly contains yttria and/or ytterbia partially stabilized zirconia particles. The proportion of the yttria and/or ytterbia partially stabilized zirconia particles in such a zirconia powder is 50 particle % or more and preferably 60 particle % or more and can be 70 particle % or more, 80 particle % or more, 90 particle % or more or 95 particle % or more. The zirconia powder may also contain fully stabilized zirconia. In addition, the zirconia powder may contain zirconia particles in which yttria and/or ytterbia does not form any solid solutions. Furthermore, the zirconia powder may contain yttria particles and/or ytterbia particles.

The zirconia powder as the process body material can be obtained as described above, but the process body material is not limited to such a zirconia powder.

For example, an aluminum compound may be mixed into the zirconia powder. The aluminum compound can be oxidized into alumina by heating in the first heating step S20 and/or the second heating step S30. Therefore, the amount of the aluminum compound mixed needs to be determined so that the amount thereof becomes the content of alumina in the zirconia sintered body with an assumption that all aluminum that is contained in the aluminum compound is oxidized into alumina. As the aluminum compound, an alumina powder, an alumina sol, hydrated alumina, aluminum hydroxide, aluminum chloride, aluminum nitrate, aluminum sulfate or the like can be used. A slurry may be produced by dispersing the zirconia powder and the aluminum compound in a solvent such as water. In a case where the slurry is produced, a zirconia powder in which the aluminum compound has been suitably dispersed can be obtained by drying the slurry.

The average particle diameter of the aluminum compound is preferably substantially the same as or smaller than that of the zirconia powder. While not particularly limited, the average particle diameter of the aluminum compound is, for example, preferably 300 nm or less and more preferably 200 nm or less and may be 150 nm or less or 100 nm or less (for example, 20 nm to 50 nm). In such a case, the aluminum compound is capable of suitably dispersing in the zirconia powder. Therefore, it is possible to more uniformly disperse alumina in the zirconia sintered body and to suitably suppress abnormal grain growth in the zirconia sintered body.

In addition, the process body material can be suitably used even when having a granular shape instead of a powder shape. The average particle diameter of the granular process body material is, for example, 10 μm to 100 μm and can be 20 μm to 90 μm or 40 μm to 80 μm. When the process body material has a granular shape, the shape stability improves, and the handleability or the workability can improve. Additionally, residual stress during forming is relaxed, which makes it possible to suppress the generation of a hot spot attributed to a powder density difference during the microwave heating. In addition, in the production method that is to be disclosed herein, since zirconia is sintered by heating with microwaves, it is possible to suitably heat even the insides of granules having a larger average particle diameter than the powder.

A production method for a granular compact material is not particularly limited, and the granular compact material can be produced by, for example, the spray drying of the zirconia powder. Such a zirconia powder may contain an aluminum compound and may further contain a binder. In the spray drying, the granular process body material can be obtained in such a way that the zirconia powder and a dispersion medium (for example, water) are mixed to prepare a slurry and the slurry is sprayed in a droplet form and dried.

The binder is preferably a component that is burnt through at the heating temperature in the first heating step or the second heating step, which will be described below. Examples of the binder include acrylic resins, epoxy-based resins, phenolic resins, amine-based resins, alkyd-based resins, cellulose-based polymers and the like. Among these, an acrylic resin is preferably contained. When an acrylic resin is contained, adhesiveness between the zirconia powders is enhanced, and zirconia granules can be suitably produced. In addition, the shape stability of the formed process body is enhanced, and the process body can be stably maintained. Examples of the acrylic resin include polymers containing alkyl(meth)acrylate as a primary monomer (a component that occupies 50 mass % or more of all monomers) or copolymers containing such a primary monomer and a secondary monomer that can be copolymerized with the primary monomer. "(Meth)acrylate" in the present specification is a term having a meaning of acrylate and methacrylate.

In a case where the amount of the binder is too large, there are cases where voids are likely to be generated in the zirconia sintered body after the binder is burnt through. When voids are generated in the zirconia sintered body, the hydrothermal degradation resistance can decrease. In addition, voids make it easy for light to be refracted, and the translucency can deteriorate. Therefore, when the amount of the entire powder that is used in the spray drying is set to 100 mass %, the content of the binder needs to be, for example, 10 mass % or less and is preferably 5 mass % or less. In addition, when the amount of the binder is too small, the effect of the binder can become insufficient. Therefore, the content of the binder needs to be, for example, 0.5 mass % or more and can be 1 mass % or more.

Next, the forming step will be described. A method for forming the process body material is not particularly limited, and it is possible to employ, for example, pressure forming, injection forming, extrusion forming, casting forming or the like. As the pressure forming, for example, cold isostatic pressing (CIP), hot isostatic pressing (HIP) or the like is preferably employed. According to CIP or HIP, a highly homogeneous process body (compact) having high density can be produced.

<First Heating Step S20>

In the first heating step S20, the process body is heated, whereby the process body is calcined, and a calcined body is obtained. Such heating can remove components such as moisture, the binder, and an impurity that can be contained in the process body. In addition, the calcination can reduce voids that can be present in the process body, which makes it possible to suitably prevent a crack that can be generated during sintering performed by heating at a higher temperature and a higher speed. The calcination can be performed at a heating temperature of, for example, 800° C. to 1200° C., preferably 1000° C. to 1100° C. The calcination time can vary with the shape, size, composition or the like of the process body and may thus be adjusted as appropriate. For example, the calcination time may be 1.5 hours to five hours and can be two hours to four hours. The heating of the process body can be performed by a well-known method, and it is possible to use, for example, a heating device such as a muffle furnace, an electric furnace or a microwave firing furnace.

The temperature increase rate in the heating of the first heating step S20 is not particularly limited and can be set to, for example, 100° C./h to 250° C./h until 800° C. is reached and to 50° C./h to 150° C./h until a predetermined temperature (for example, 1000° C. to 1200° C.) is reached. In such a case, it is possible to prevent abrupt sintering and to suppress the generation of a crack.

<Second Heating Step S30>

In the second heating step S30, the process body (calcined body) after the first heating step S20 is sintered by microwave heating, and the sintered body is obtained. Since the microwave heating makes it possible to rapidly heat the inside of the calcined body, the difference between the progress of the sintering of the surface and the progress of the sintering of the inside of the calcined body becomes small, and it is possible to further reduce voids in the zirconia sintered body. Hereinafter, an embodiment of the second heating step S30 will be described with reference to a drawing. A method for the microwave heating is not limited to the following example.

Figure 2:
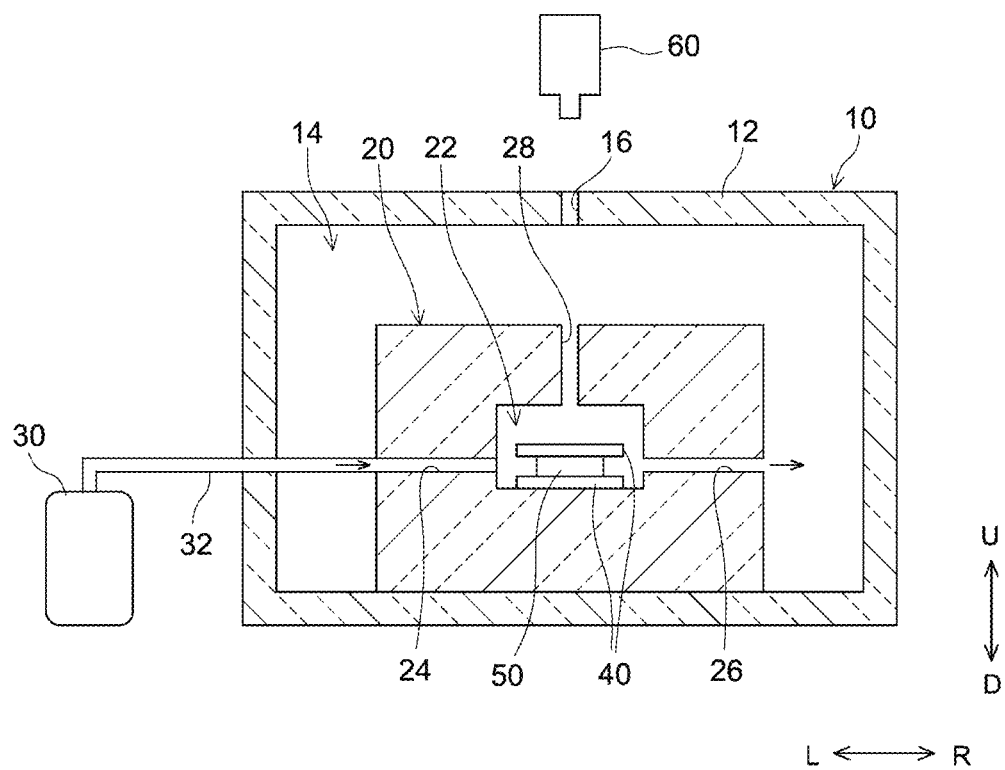
FIG. 2 is a schematic view showing one example of a method for microwave heating of a process body (calcined body).
Figure 3:
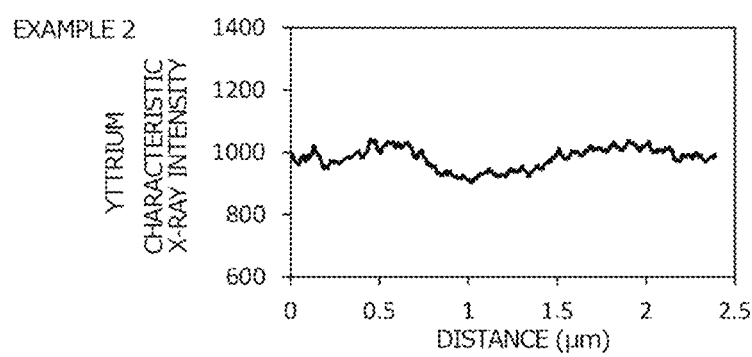
FIG. 3 is a graph expressing results of line analysis of a surface of a zirconia sintered body of Example 2 by EPMA.
Figure 4:
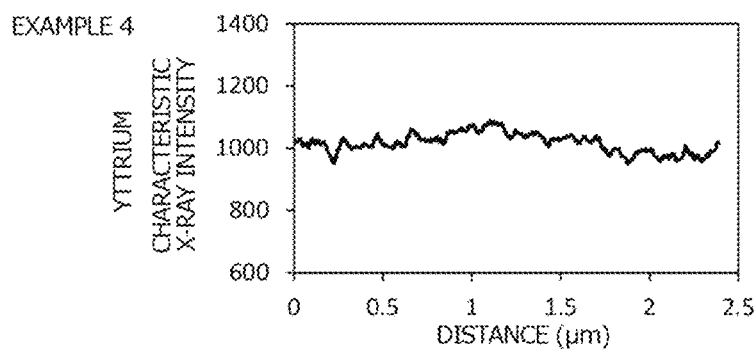
FIG. 4 is a graph expressing results of line analysis of a surface of a zirconia sintered body of Example 4 by EPMA.
Figure 5:
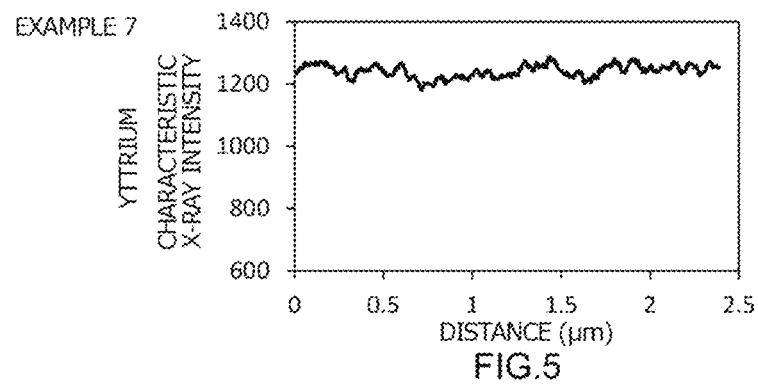
FIG. 5 is a graph expressing results of line analysis of a surface of a zirconia sintered body of Example 7 by EPMA.
Figure 6:
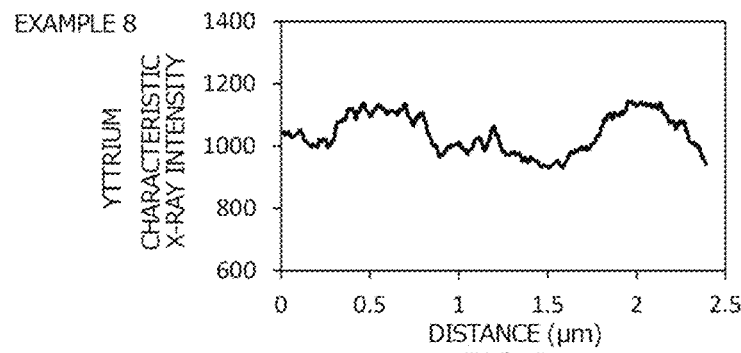
FIG. 6 is a graph expressing results of line analysis of a surface of a zirconia sintered body of Example 8 by EPMA.

FIG. 2 is a schematic view showing one example of the method for the microwave heating of the calcined body. Dimensional relationships (length, width, thickness and the like) in FIG. 2 do not reflect actual dimensional relationships. Upward, downward, rightward and leftward are indicated by arrows U, D, R and L in the drawing, respectively. Here, upward, downward, rightward and leftward are designated only for the convenience of description and do not limit installation forms.

As shown in FIG. 2, a microwave heating device 10 has a partition 12 and a heating space 14. In the heating space 14, a heat-insulated container 20 is installed, susceptors 40 and a calcined body 50 are accommodated in an accommodation space 22 of the heat-insulated container 20. In addition, a gas supplying machine 30 is connected to the accommodation space 22 of the heat-insulated container 20. A radiation thermometer 60 is installed at a distant position outside the microwave heating device 10.

The microwave heating device 10 has the heating space 14 surrounded by the partition 12. The heating space 14 is a space that accommodates a microwave heating target. While not shown, the side walls, ceiling and/or bottom wall of the heating space 14 have microwave radiation portions and are capable of radiating microwaves to the target accommodated in the heating space 14 and heating the target. The microwaves need to have a frequency that has been used for conventional microwave heating, and, for example, microwaves having a frequency of 0.3 GHz to 3 GHz (for example, 2.45 GHZ) can be used.

The partition 12 thermally insulates the heating space 14 of the microwave heating device 10 and the outside, and a commercially available microwave device can be used. In addition, the heating space 14 side of the partition 12 may be lined with a heat-insulating material from the viewpoint of enhancing the heat-insulating properties.

A through hole 16 for measuring the temperature of the target in the heating space 14 is provided in the partition 12. The through hole 16 penetrates the partition so as to connect the heating space 14 and the outside of the microwave heating device 10.

As the microwave heating device 10 having such a configuration, for example, µ-Reactor EX or µ-Reactor Mx manufactured by Shikoku Instrumentation Co., Ltd. or the like can be used.

The heat-insulated container 20 has the accommodation space 22 where the susceptors 40 and the calcined body 50 can be accommodated. In addition, as shown in FIG. 2, in this embodiment, the heat-insulated container 20 has a gas introduction hole 24 for connecting the accommodation space 22 and the gas supplying machine 30, a gas exhaust hole 26 that makes the accommodation space 22 and the heating space 14 communicate with each other and a through hole 28 for measuring the temperature of the article to be heated in the accommodation space 22. In this embodiment, the heat-insulated container 20 is a rectangular parallelepiped box-type container, but the shape thereof is not particularly limited and may be, for example, a cylindrical shape, a prismatic shape or the like. In addition, while not shown, in this embodiment, the heat-insulated container 20 is designed to be separatable into a lid part and a case part and is designed to enable the article to be heated to be easily put into and out of the accommodation space 22. As a material of the heat-insulated container 20, for example, a ceramic fiber such as an alumina silica fiber can be employed.

The gas introduction hole 24 is a through hole that makes the accommodation space 22 and the heating space 14 communicate with each other and is designed so that a pump 32 connected with the gas supplying machine 30 can be inserted thereinto. Therefore, a desired gas can be supplied to the accommodation space 22, and the atmosphere in the accommodation space 22 can be controlled.

The gas exhaust hole 26 is a through hole that makes the accommodation space 22 and the heating space 14 communicate with each other and is designed so that the accommodation space 22 is not sealed. Therefore, a phenomenon in which oxygen in the accommodation space 22 is consumed in association with the progress of the firing of the calcined body 50 and the accommodation space 22 turns into a reducing atmosphere can be prevented. In addition, the gas exhaust hole 26 can prevent a gas that is supplied from the gas introduction hole 24 from remaining in the accommodation space 22. In FIG. 2, one gas exhaust hole 26 is provided, but a plurality of (two or more) gas exhaust holes may be provided. In addition, in this embodiment, the gas exhaust hole 26 is provided in a wall facing a wall provided with the gas introduction hole 24, but the position of the gas exhaust hole 26 is not particularly limited. The diameter of the gas exhaust hole 26 is not particularly limited and can be set to, for example, approximately 5 mm to 50 mm or, for example, approximately 5 mm to 20 mm.

As shown in FIG. 2, in this embodiment, the through hole 28 that makes the accommodation space 22 and the heating space 14 communicate with each other is provided on the upper side of the heat-insulated container 20. In addition, here, the through hole 28 is disposed so that the through hole 28 and the through hole 16 in the microwave heating device 10 are arranged on a straight line. This makes it possible to measure the temperature of the article to be heated disposed in the accommodation space 22 with the radiation thermometer 60 installed outside the microwave heating device 10. The through hole 28 needs to be provided in a size large enough for the radiation thermometer 60 to measure the temperature of the article to be heated, and the diameter of the through hole 28 can be thus set to approximately 5 mm to 10 mm for example, while not particularly limited. In this embodiment, the gas exhaust hole 26 and the through hole 28 are each provided, but only one thereof may be provided in the configuration since the above-described functions of both the gas exhaust hole 26 and the through hole 28 can be exhibited by one through hole.

The gas supplying machine 30 is capable of supplying a desired gas to the accommodation space 22 in the heat-insulated container 20 through the pump 32 and adjusting the atmosphere of the accommodation space 22. The gas supplying machine 30 can be modified as appropriate depending on the desired gas, and a commercially available gas supplying machine (for example, an oxygen supplying machine) can be thus used with no particular limitations. In the case of adjusting the accommodation space 22 under the atmospheric atmosphere, a blower or the like may be employed as the gas supplying machine 30.

When the oxygen concentration around the calcined body 50 decreases in association with the firing of the calcined body 50, there are cases where zirconia that is contained in the calcined body 50 is reduced. Therefore, the zirconia sintered body can get dark, and the aesthetics can be impaired. Therefore, the microwave heating is preferably performed in an oxidative atmosphere. Examples of the oxidative atmosphere include the atmospheric atmosphere or an atmosphere in which the oxygen concentration is higher than that in the atmospheric atmosphere. In particular, the oxygen concentration is preferably 30 vol % or more and can be, for example, 50 vol % or more or 70 vol % or more. Under such an oxidative atmosphere, the zirconia sintered body getting dark can be further suppressed. The upper limit of the oxygen concentration in the atmosphere is not particularly limited, and the oxygen concentration can be set to 100 vol % or less; however, when the oxygen concentration is too high, there are cases where abnormal heating caused by oxygen plasma occurs. Therefore, the oxygen concentration is, for example, preferably 95 vol % or less and more preferably 90 vol % or less. Such a control of the atmosphere to be oxidative may be performed in the accommodation space 22 in the heat-insulated container 20 where the calcined body 50 is installed.

In addition, since the atmosphere is controlled to be oxidative during the firing of the calcined body 50, it is preferable to continuously supply the atmosphere or a gas having the above-described oxygen concentration to the accommodation space 22 (the calcined body 50 in detail). This makes it possible to suppress a change in the atmosphere of the accommodation space 22 in association with the firing (for example, a decrease in the oxygen concentration or the like). In addition, as shown by the arrows in FIG. 2, a gas that is supplied from the gas supplying machine 30 flows into the accommodation space 22 and then is exhausted from the gas exhaust hole 26 and/or the through hole 28. When such an oxygen flow environment is formed around the calcined body 50, it is possible to suppress the occurrence of abnormal heating caused by oxygen plasma.

The susceptor 40 is a heating auxiliary member capable of increasing the efficiency of the microwave heating by efficiently converting the energy of microwaves into a thermal energy. Specifically, the susceptor 40 absorbs microwaves, thereby rapidly reaches a higher temperature than the calcined body 50 and is thus capable of assisting an increase in the temperature of the calcined body 50 by thermal conduction. When the calcined body 50 reaches a high temperature, the calcined body 50 itself gets to easily absorb microwaves and is capable of behaving as a microwave absorber. When the calcined body 50 gets to easily absorb microwaves, the internal heating mechanism of the calcined body 50 becomes easy to be accelerated by the microwave heating. Therefore, the sintering of the inside of the calcined body 50 is accelerated, voids are difficult to remain in the calcined body, and a zirconia sintered body having excellent strength and excellent translucency can be produced.

From the viewpoint of increasing the temperature of the calcined body 50 within a short period of time, the susceptors 40 are preferably disposed so as to sandwich the calcined body 50 from both sides in a predetermined direction before the microwave heating. Examples thereof include aspects in which the susceptors 40 are disposed on both sides (that is, on the upper side and the lower side) in the vertical direction (up and down direction) of the calcined body 50 or disposed on both sides in at least one direction in the horizontal direction of the calcined body 50 and the like. In such a case, since the surfaces of the calcined body 50 on both sides in a predetermined direction are heated with the susceptors 40, it is possible to increase the microwave absorption efficiency of the calcined body 50 within a shorter period of time. As a result, the internal heating of the calcined body 50 by the microwave heating can be realized within a short period of time, and it is thus possible to further reduce the voids inside the zirconia sintered body. The susceptors 40 to be disposed are typically disposed so as to come into contact with the surfaces of the calcined body 50, but a gap may be present between the susceptor 40 and the surface of the calcined body 50. The size of such a gap is not particularly limited, but is, for example, preferably 3 mm or less, more preferably 2 mm or less and still more preferably 1 mm or less.

In addition, the calcined body 50 is preferably not sealed with the susceptors 40. This makes it easy for microwaves to be directly absorbed into the calcined body 50 without being impaired by the susceptor 40. Therefore, the internal heating of the calcined body can be induced from a low-temperature region compared with a case where the susceptors completely encapsulate the calcined body (for example, a case where the calcined body is installed in a closed box-type susceptor). As a result, pores that remain in the zirconia sintered body can be reduced compared with those in a sintering aspect attributed to thermal conduction from surfaces. In addition, the calcined body 50 is not sealed with the susceptors 40, whereby it is possible to prevent the phenomenon in which oxygen around the calcined body 50 is consumed and the atmosphere turns into a reducing atmosphere.

In addition, it is preferable that no susceptors 40 are installed on both sides of the calcined body 50 in at least one direction that is different from the predetermined direction in which the susceptors 40 are disposed (the calcined body is open). This makes it easier for microwaves to be directly absorbed into the calcined body 50, and internal heating can be induced more homogeneously from a lower-temperature region. In addition, one direction in which no susceptors 40 are installed is provided, whereby the calcined body 50 can be disposed in the flow of the gas that is supplied from the gas supplying machine 30, and it is thus possible to more suitably control the atmosphere around the calcined body 50.

In this embodiment, as shown in FIG. 2, the calcined body 50 is sandwiched in the vertical direction by the two plate-shaped susceptors 40, and the calcined body 50 is not covered with the susceptors 40 in the horizontal direction. In such a configuration, since no susceptors 40 are disposed in any of the horizontal directions of the calcined body 50, particularly, it becomes easy for microwaves to be absorbed into the calcined body 50, and a zirconia sintered body in which the internal voids are reduced is likely to be produced.

As the susceptor 40, a SiC susceptor containing silicon carbide (SiC) as a main component is preferably employed. Here, "containing SiC as a main component" refers to the fact that SiC occupies 50 mass % or more of a compound that configures the susceptor 40. Examples of the SiC susceptor include single crystal SiC, recrystallized SiC, reaction-sintered SiC, nitride-bonded SiC, oxide-bonded SiC, silicon carbide fibers and the like. In addition, among these, recrystallized SiC or a silicon carbide fiber, which is a material having a relatively high porosity, can be preferably used from the viewpoint of increasing the microwave absorption efficiency. In addition, between these, recrystallized SiC is excellent in terms of heat resistance, and it is thus possible to particularly preferably use recrystallized SiC. Furthermore, as recrystallized SiC, since there are cases where the microwave absorption efficiency decreases in dense recrystallized SiC, the porosity of recrystallized SiC needs to be, for example, 10% to 90% and is preferably 10% to 30%. The porosity can be measured by a conventionally well-known method and can be measured by, for example, the mercury intrusion method.

In a case where the susceptor 40 has a plate shape, the thickness of one susceptor is, for example, preferably 1 mm to 4 mm and more preferably 2 mm to 3 mm. When the susceptor 40 is too thin, the strength of the susceptor can decrease. In addition, when the susceptor 40 is too thick, the susceptor 40 is not easily heated, and the temperature increase rate can become slow. Therefore, when the thickness is within the above-described range, the balance between both the strength of the susceptor 40 and the temperature increase rate of the susceptor 40 becomes suitable. Therefore, the voids inside the zirconia sintered body can be reduced more suitably.

In the embodiment shown in FIG. 2, one plate-shaped susceptor 40 is disposed on each of the upper side and the lower side of the calcined body 50; however, in a case where a plurality of (two or more) plate-shaped susceptors 40 are provided, the number thereof is not particularly limited. For example, two or more susceptors 40 may be overlaid on each of the upper side and the lower side of the calcined body 50. In addition, the numbers of the susceptors 40 used on the upper side and the lower side of the calcined body 50 may be different.

In the present embodiment, the susceptor 40 has a plate shape, but the shape thereof is not particularly limited as long as the susceptors 40 are disposed on both sides in a predetermined direction of the calcined body 50. Examples thereof include box-type (for example, a hexahedral shape) susceptor having through holes on a pair of facing surfaces, a columnar susceptor (for example, a cylindrical or prismatic susceptor) and the like.

The radiation thermometer 60 is capable of measuring the temperature of a target in a non-contact manner. As shown in FIG. 2, in this embodiment, the radiation thermometer 60 is installed at a position distant from the microwave heating device 10 and measures the surface temperature of the susceptor 40 on the upper side of the calcined body 50. In the present specification, the heating temperature during the microwave heating in the second heating step S30 and the temperature used to calculate the temperature decrease rate in the cooling step S40, which is described below, refer to temperatures measured with the radiation thermometer 60. The radiation thermometer 60 is preferably fixed to a predetermined position with a clamp or the like from the viewpoint of more accurately measuring temperature changes due to the microwave heating. As the radiation thermometer 60, for example, an OPTCTRF1MHSFVFC3 sensor (pseudo emissivity setting: 1.0) manufactured by Optris can be used.

The temperature of the microwave heating needs to be, for example, 1600° C. or higher (for example, higher than 1600° C.) and is preferably 1620° C. or higher, more preferably 1650° C. or higher, still more preferably 1700° C. or higher (for example, higher than 1700° C.) and particularly preferably 1720° C. or higher. The mechanism thereof is not particularly limited, but it is assumed that, when the temperature of the microwave heating is set to a high temperature of 1600° C. or higher, the dense sintered body in which the voids that can be generated inside the zirconia sintered body are suppressed is produced. In addition, in the crystal phase of the zirconia sintered body, a variation in crystal phase is reduced and the discontinuity of crystal grain boundaries can be reduced. Therefore, it is assumed that light that passes through the zirconia sintered body is less likely to be reflected or refracted at the interfaces between the crystals and the translucency thus improves.

In addition, while not particularly limited, the temperature of the microwave heating is appropriately, for example, 2000° C. or lower from the viewpoint of the heat resistance or the like of the heating device and can be set to 1900° C. or lower, 1800° C. or lower, 1750° C. or lower, or 1730° C. or lower. The holding time of the microwave heating is changed as appropriate depending on the shape, size, composition or the like of the calcined body 50 and can be set to, for example, approximately one minute to 20 minutes or, for example, approximately one minute to 10 minutes. The holding time mentioned herein does not include the time taken to increase the temperature up to the microwave heating temperature.

A heating method of the microwave heating is not particularly limited, for example, any of a single mode and a multimode can be used, but a multimode is preferably employed. In the single mode, there is a possibility that plasma may be generated in the calcined body 50 depending on the disposition position, size or the like of the calcined body 50, and there are cases where cracking occurs in the zirconia sintered body. On the other hand, in the multimode, the concentration of an electromagnetic field in the heating space 14 is suppressed, and plasma is thus less likely to be generated. Therefore, the occurrence of cracking in the zirconia sintered body can be suppressed.

The temperature increase rate of the microwave heating is changed as appropriate depending on the shape, size, composition or the like of the calcined body and is thus not particularly limited. For example, in the case where the total proportion of yttria and ytterbia in the zirconia sintered body is 4 mol % to 5 mol %, the temperature increase rate until approximately 1000° C. to 1150° C. is reached can be set to 500° C./min to 900° C./min. This makes it possible to produce a zirconia sintered body within a shorter period of time. In addition, the temperature increase rate is preferably set to, for example, 20° C./min to 50° C./min until approximately 1150° C. to 1200° C. is reached thereafter. This makes it possible to reduce the generation of a crack due to abrupt sintering of zirconia. In addition, the temperature increase rate can be set to, for example, 40° C./min to 100° C./min, and preferably 40° C./min to 60° C./min until approximately 1600° C. to 2000° C. is reached thereafter. In such a case, the progress of the sintering of the calcined body is appropriately controlled, and a zirconia sintered body having higher translucency and hydrothermal degradation resistance can be produced.

In the case where the total proportion of yttria and ytterbia in the zirconia sintered body is 5 mol % to 6 mol %, the temperature increase rate until approximately 1100° C. to 1250° C. is reached is preferably set to 500° C./min to 900° C./min from the viewpoint of shortening the sintering time. In addition, for example, the temperature increase rate until approximately 1250° C. to 1550° C. is reached is preferably set to 5° C./min to 50° C./min from the viewpoint of reducing the crack. Furthermore, the temperature increase rate until approximately 1600° C. to 2000° C. is reached thereafter is for example set to 40° C./min to 100° C./min and preferably to 40° C./min to 60° C./min.

The shape of the calcined body 50 is not particularly limited, but is preferably, for example, a disc shape from the viewpoint of more uniformly performing sintering with microwaves. The thickness of the calcined body 50 is, for example, preferably 0.5 mm to 10 mm and more preferably 0.5 mm to 2 mm. Within such a range, it is possible to efficiently perform sintering with microwaves while holding the strength of the calcined body 50. In addition, the maximum diameter of the calcined body 50 is, for example, preferably 10 mm to 60 mm and more preferably 10 mm to 20 mm. Within such a range, it is possible to more uniformly perform sintering with microwaves.

<Cooling Step S40>

In the cooling step S40, the process body after the second heating step S30 is cooled rapidly to 1300° C. The cooling step S40 is a step that is performed after the process body subjected to the microwave heating in the second heating step S30 is heated and kept at a predetermined temperature (for example, 1600° C. to 2000° C.), and is typically performed continuously after the microwave heating. By such rapid cooling, the zirconia sintered body that is to be disclosed herein can be obtained.

The temperature decrease rate when the process body is cooled to 1300° C. is, for example, 50° C./min or more, preferably 100° C./min or more, and more preferably 200° C./min or more. The upper limit of the temperature decrease rate is not particularly limited and can be, for example, 1000° C./min or less or 500° C./min or less. A cooling method is not limited in particular as long as the temperature decrease rate in the aforementioned range can be achieved; for example, control of microwave radiation, natural cooling, blowing, or the like is given. In the case of supplying a gas containing oxygen from the gas supplying machine 30 in the second heating step S30, the gas supply may be either continued or stopped in the cooling step S40. According to the present inventor's examination, the zirconia sintered body can easily be produced more stably by stopping the gas supply during the temperature decrease.

In the present specification, the term "temperature decrease rate" in the cooling step S40 refers to the average temperature decrease rate after the temperature decrease starts and before 1300° C. is reached.

As described above, in the production method that is to be disclosed herein, since the process body is sintered by the microwave heating, the dense zirconia sintered body with fewer voids inside can be obtained. In addition, performing the microwave heating can prevent the temperature in the heating space itself of the microwave heating device from becoming as high as that of the process body and the susceptor; thus, it is possible to perform rapid cooling at the aforementioned temperature decrease rate and the proportion of the crystal phase in which the c/a axis length ratio of the unit lattice of the zirconia sintered body is 1.0055 or more and less than 1.010 can be increased. As a result, the zirconia sintered body with excellent translucency and hydrothermal degradation resistance is achieved.

The reason why the excellent translucency and hydrothermal degradation resistance are achieved is not limited in particular and is assumed as below.

In the process body sintered in the conventional heating furnace whose heating space itself has high temperature, the temperature decrease rate after the sintering is gradient. Therefore, a crystal phase in which the c/a axis length ratio of the unit lattice is more than 1.012 and 1.017 or less (for example, tetragonal crystal) and a crystal phase in which the c/a axis length ratio of the unit lattice is 1 or more and less than 1.0055 (for example, cubic crystal) are present in a mixed state and the yttrium concentration segregates locally. In general, it is considered that such segregation induces the hydrothermal degradation of the zirconia sintered body. On the other hand, in the present technique, it is presumed that performing the rapid cooling after the sintering by the microwaves suppresses the yttrium segregation. As a result, it is considered that the phase, which has been precipitated conventionally as the crystal phase in which the c/a axis length ratio of the unit lattice is 1 or more and less than 1.0055 (for example, cubic crystal), is precipitated as the crystal phase in which the c/a axis length ratio of the unit lattice is 1.0055 or more and less than 1.010 (for example, metastable tetragonal crystal) or the crystal phase in which the c/a axis length ratio of the unit lattice is more than 1.012 and 1.017 or less (for example, tetragonal crystal); thus, a crystal structure that is more homogeneous than before is achieved. In the homogeneous crystal structure, the hydrothermal degradation is not induced easily and the light reflection and refraction at a crystal interface are suppressed. Moreover, since the highly dense zirconia sintered body with fewer voids is achieved by the microwave heating, water does not easily enter the zirconia sintered body. For this reason, it is presumed that the zirconia sintered body that is to be disclosed herein has the excellent translucency and hydrothermal degradation resistance.

In the zirconia sintered body that is to be disclosed herein, when the entire crystal phase is set to 100 mass %, the proportion of the crystal phase in which the c/a axis length ratio of the unit lattice is 1.0055 or more and less than 1.010 is for example 40 mass % or more, preferably 45 mass % or more, and more preferably 50 mass % or more. The upper limit of this proportion is not limited in particular and may be 100 mass % or less, or can be 80 mass % or less or 60 mass % or less. As the proportion of such a crystal phase is higher, the translucency and the hydrothermal degradation resistance tend to improve.

In the zirconia sintered body that is to be disclosed herein, when the entire crystal phase is set to 100 mass %, the total proportion of the crystal phase in which the c/a axis length ratio of the unit lattice is 1.0055 or more and less than 1.010 and the crystal phase in which the c/a axis length ratio of the unit lattice is more than 1.012 and 1.017 or less is for example 75 mass % or more, preferably 85 mass % or more, more preferably 95 mass % or more, and particularly preferably 98 mass % or more, and furthermore can be 100 mass %. As this proportion is higher, the homogeneity of the crystal structure tends to improve; therefore, the superior translucency and hydrothermal degradation resistance are achieved.

In the zirconia sintered body that is to be disclosed herein, when the entire crystal phase is set to 100 mass %, the proportion of the crystal phase in which the c/a axis length ratio of the unit lattice is 1 or more and less than 1.0055 is for example 25 mass % or less, more preferably 15 mass % or less, still more preferably 5 mass % or less, and particularly preferably 2 mass % or less, and furthermore can be 0 mass % (such a crystal phase is not contained or is contained by a detection limit or less). As this proportion is lower, the segregation of yttrium and/or ytterbium is suppressed and the superior translucency and hydrothermal degradation resistance can be achieved.

In the zirconia sintered body that is to be disclosed herein, the segregation of yttrium or ytterbium is suppressed. For example, in some aspects, the segregation of yttrium or ytterbium at a boundary of the crystal particle on a surface of the zirconia sintered body is suppressed. The distribution of yttrium or ytterbium can be evaluated as the distribution of yttria or ytterbia. In addition, in some aspects, yttria or ytterbium is diffused homogeneously.

The distribution of yttrium or ytterbium can be evaluated by, for example, line analysis with a field emission electron probe micro analyzer (FE-EPMA). In the zirconia sintered body that is to be disclosed herein, a coefficient of variation (CV) in characteristic X-ray intensity of yttrium or ytterbium that is measured by the line analysis with FE-EPMA is, for example, 0.04 or less, 0.035 or less, 0.031 or less, or 0.02 or less. As this coefficient of variation is smaller, yttrium or ytterbium is distributed more homogeneously and the translucency and the hydrothermal degradation resistance improve.

In the present specification, the coefficient of variation is calculated based on a value obtained by averaging five points in the characteristic X-ray intensity data. The coefficient of variation is a value obtained by dividing the standard deviation by the arithmetic mean. The aforementioned line analysis is performed on a mirror-polished surface of the zirconia sintered body. A measurement region of the line analysis is set so as to pass a crystal interface of the zirconia sintered body at least once (preferably, twice or more).

In the zirconia sintered body that is to be disclosed herein, the proportion of monoclinic crystals after the hydrothermal degradation test, in which immersion in hot water of 140° C. is performed for 100 hours, is for example 10% or less, preferably 5% or less, more preferably 3% or less, and particularly preferably 1% or less. Note that the hydrothermal degradation test can be performed by immersing the zirconia sintered body with the mirror-polished surface in hot water of 140° C. for 100 hours using a high-pressure microreactor (MMS-500, OMLABO). The proportion of monoclinic crystals can be measured by acquiring the X-ray diffraction pattern of the polished surface of the zirconia sintered body after the hydrothermal degradation test.

In the zirconia sintered body that is to be disclosed herein, for example, the total light transmittance is 40% or more, 42% or more, 44% or more, 45% or more, 46% or more, or 47% or more. When the total light transmittance is 40% or more, in the case of using the zirconia sintered body in, for example, a dental material, the excellent aesthetics required for the dental material is achieved. In addition, while not particularly limited, the total light transmittance can be, for example, 60% or less. In the present specification, "total light transmittance" refers to the total light transmittance with respect to a D65 light source in the thickness direction of a 1 mm-thick disc-shaped test piece.

As described above, the zirconia sintered body that is to be disclosed herein has both the excellent translucency and the excellent hydrothermal degradation resistance and can be thus suitably used as, for example, dental materials. Examples of the dental materials include dentures such as dentures for front teeth and dentures for back teeth, denture mill blanks, orthodontic brackets, dental prosthetics, bridges, and the like.

As described above, specific aspects of the technique that has been disclosed herein include what will be described in each of the following items.

Item 1: The production method for a zirconia sintered body, the production method including: the process body preparing step of preparing the process body containing zirconia and yttria and/or ytterbia, in which the total proportion of the yttria and the ytterbia is 4 mol % or more and 6 mol % or less when the total of the zirconia, the yttria, and the ytterbia is set to 100 mol %; the first heating step of heating the process body at 800° C. or higher and 1200° C. or lower; the second heating step of heating the process body after the first heating step at 1600° C. or higher and 2000° C. or lower by the microwave heating; and the cooling step of decreasing the temperature of the process body after the second heating step to 1300° C. at a rate of 50° C./min or more.

Item 2: The production method according to Item 1, in which the heating method of the microwave heating is the multimode.

Item 3: The production method according to Item 1 or 2, in which in the second heating step, the microwave heating is performed in the oxidative atmosphere.

Item 4: The production method according to Item 3, in which in the second heating step, the microwave heating is performed in the atmosphere where the oxygen concentration is 30 vol % or more and 100 vol % or less.

Item 5: The production method according to any one of Items 1 to 4, in which in the second heating step, the SiC susceptors are disposed so as to sandwich the process body from both sides in the predetermined direction.

Item 6: The production method according to any one of Items 1 to 5, in which in the process body preparing step, the process body is prepared by forming the granules containing zirconia.

Item 7: The zirconia sintered body containing zirconia and yttria and/or ytterbia, in which the total proportion of the yttria and the ytterbia is 4 mol % or more and 6 mol % or less when the total of the zirconia, the yttria, and the ytterbia is set to 100 mol %, and the coefficient of variation in characteristic X-ray intensity of the yttrium or the ytterbium measured by the line analysis using EPMA is 0.04 or less.

Item 8: The zirconia sintered body according to Item 7, in which the proportion of the crystal phase in which the c/a axis length ratio of the unit lattice is 1.0055 or more and less than 1.010 is 40 mass % or more when the entire crystal phase is set to 100 mass %.

Item 9: The zirconia sintered body according to Item 7 or 8, in which the total light transmittance to the D65 light source in the thickness direction of the test piece with a thickness of 1 mm is 40% or more.

Item 10: The zirconia sintered body according to any one of Items 7 to 9, in which the proportion of the monoclinic crystal after the immersion in the hot water of 140° C. for 100 hours is 10% or less.

Item 11: The zirconia sintered body according to any one of Items 7 to 10, in which the proportion of the crystal phase in which the c/a axis length ratio of the unit lattice is 1 or more and less than 1.0055 is 25 mass % or less when the entire crystal phase is set to 100 mass %.

Item 12: The zirconia sintered body according to any one of Items 7 to 11, further containing alumina, in which the proportion of the alumina is 0.15 mass % or less when the entire zirconia sintered body is set to 100 mass %.

Item 13: The dental material containing the zirconia sintered body according to any one of Items 7 to 12.

Item 14: The dental material according to Item 13, in which the dental material is a denture, a denture mill blank, or an orthodontic bracket.

Hereinafter, examples relating to the technique that has been disclosed herein will be described, but such examples do not intend to limit the technique that has been disclosed herein.

Test 1

Example 1

Yttria was mixed with a zirconia sol generated by causing a hydrolysis reaction of a zirconium oxychloride solution. At this time, the amount of yttria was adjusted to be 4.1 mol % with respect to the total of zirconia and yttria. Such a mixture was dried and then calcined at 1120° C. for four hours, thereby obtaining a partially stabilized zirconia powder. Such a zirconia powder was crushed with a ball mill in which zirconia balls having a diameter of 1 mm were used and then sorted with a mesh sieve, thereby obtaining a zirconia powder having an average particle diameter of 150 nm to 200 nm as a compact material. After that, an alumina powder having an average particle diameter of 30 nm was mixed with the zirconia powder, thereby preparing a zirconia powder containing 0.05 mass % of alumina. A disc-shaped mold was filled with this zirconia powder, a pressure of 0.78 MPa was applied thereto, then, a compact was removed from the mold, and CIP forming was performed on such a compact at 196 MPa. After that, the obtained compact was heated at 1100° C. for two hours, thereby obtaining a calcined body. At this time, the temperature increase rate was set to 120° C./h up to 800° C. and to 100° C./h up to 1100° C.

The calcined body was accommodated in a heat-insulated container in a state where the calcined body was placed on a 2 mm-thick plate-shaped SiC susceptor and moreover a 2 mm-thick plate-shaped SiC susceptor was placed on the calcined body. As the heat-insulated container, a container having the configuration similar to that of the heat-insulated container 20 shown in FIG. 2 was used. In addition, a microwave heating device was installed in the heat-insulated container. For the SiC susceptors, recrystallized SiC was used. As the microwave heating device, μ-Reactor EX manufactured by Shikoku Instrumentation Co., Ltd. was used.

Next, a gas having an oxygen concentration of 90 vol % was supplied into the heat-insulated container using M1O2 silent (manufactured by Kobe Medicare Corporation) as a gas supplying machine. In addition, microwave heating was initiated while supplying the gas, and the temperature was increased at 600° C./min up to 1050° C. and at 40° C./min up to 1730° C. and maintained at 1730° C. for one minute. After that, the temperature was decreased at a temperature decrease rate of 10° C./min to 1300° C. and when 1300° C. was reached, a power source of the microwave heating device was turned off to decrease the temperature. Note that when the temperature was decreased, the gas supply was stopped (the gas supply was stopped at the temperature decrease similarly in Examples 2 to 7 to be described below). A zirconia sintered body of Example 1 was produced as described above. A multimode was used as a microwave heating method. In addition, OPTCTRF1MHSFVFC3 sensor manufactured by Optris was used for the measurement of the temperature, and the temperature of the SiC susceptor on the upper side of the calcined body was measured.

Example 2

The temperature decrease rate to 1300° C. after the microwave heating in the production method in Example 1 was changed to 50° C./min. A zirconia sintered body of Example 2 was produced in a manner similar to Example 1 except what has been described above.

Example 3

The temperature decrease rate to 1300° C. after the microwave heating in the production method in Example 1 was changed to 100° C./min. A zirconia sintered body of Example 3 was produced in a manner similar to Example 1 except what has been described above.

Example 4

The temperature decrease rate to 1300° C. after the microwave heating in the production method in Example 1 was changed to 200° C./min. A zirconia sintered body of Example 4 was produced in a manner similar to Example 1 except what has been described above.

Example 5

The production method according to Example 1 was changed so that the alumina powder was not mixed with the zirconia powder having an average particle diameter of 150 nm to 200 nm and a polyacrylic binder was mixed as the binder so that the amount thereof reached 3 mass %. Such a mixture was made into granular shape by spray drying, thereby obtaining zirconia granules having an average particle diameter of 70 μm. Such zirconia granules were used as a compact material, a calcined body was obtained in a manner similar to Example 1, the heating was performed under the temperature increase condition similar to that in Example 1, and then, the temperature was decreased to 1300° C. at a temperature decrease rate of 100° C./min. Then, when 1300° C. was reached, the power source of the microwave heating device was turned off and thus, a zirconia sintered body of Example 5 was produced.

Example 6

The production method according to Example 5 was changed so that the alumina powder was mixed with the zirconia powder having an average particle diameter of 150 nm to 200 nm so that the amount of the alumina powder reached 0.125 mass %. The temperature increase rate for the microwave heating was then changed to 600° C./min up to 1150° C., 20° C./min up to 1200° C., and 40° C./min up to 1620° C. and 1620° C. was kept for one minute. After that, the temperature was decreased to 1300° C. at a temperature decrease rate of 50° C./min, and when 1300° C. was reached, the power source of the microwave heating device was turned off and thus, a zirconia sintered body of Example 6 was produced.

Example 7

The production method according to Example 4 was changed so that the yttria concentration became 5.6 mol %. In addition, the proportion of the alumina powder was changed to 0.015 mass %. The temperature increase rate for the microwave heating was then changed to 600° C./min up to 1200° C., 5° C./min up to 1500° C., and to 40° C./min up to 1730° C. and 1730° C. was kept for one minute. After that, the temperature was decreased to 1300° C. at a temperature decrease rate of 200° C./min, and when 1300° C. was reached, the power source of the microwave heating device was turned off and thus, a zirconia sintered body of Example 7 was produced.

Example 8

The heating by microwaves in the production method according to Example 1 was changed to heating by an electric furnace. Specifically, the temperature of the calcined body was increased to 1450° C. at a rate of 120° C./h and after the temperature was kept for 120 minutes, the temperature was decreased at a rate of 5° C./min. The operation other than this operation was performed similarly to Example 1 and thus, a zirconia sintered body of Example 8 was produced.

Example 9

The production method according to Example 8 was changed so that the yttria concentration became 5.6 mol %. In addition, the proportion of the alumina powder was changed to 0.015 mass %. The operation other than this operation was performed similarly to Example 8 and thus, a zirconia sintered body of Example 9 was produced.

Example 10

Yttrium chloride and ytterbium chloride were mixed with a zirconia sol generated by causing a hydrolysis reaction of a zirconium oxychloride solution. Yttrium chloride and ytterbium chloride were mixed such that the amount of yttria reached 1.7 mol % and the amount of ytterbia reached 2.4 mol % with respect to the total of zirconia, yttria, and ytterbia when yttrium chloride was converted into yttria and ytterbium chloride was converted into ytterbia. Such a mixture was dried and then calcined at 1120° C. for four hours, thereby obtaining a partially stabilized zirconia powder. Such a zirconia powder was crushed with a ball mill in which zirconia balls having a diameter of 1 mm were used and then sorted with a mesh sieve, thereby obtaining a zirconia powder having an average particle diameter of 150 nm to 200 nm as a compact material. An alumina powder having an average particle diameter of 30 nm was mixed into this powder such that the amount thereof reached 0.05 mass %. A disc-shaped mold was filled with this zirconia powder, a pressure of 0.78 MPa was applied thereto, then, a compact was removed from the mold, and CIP forming was performed on such a compact at 196 MPa. After that, the obtained compact was heated at 1100° C. for two hours, thereby obtaining a calcined body. At this time, the temperature increase rate was set to 120° C./h up to 800° C. and to 100° C./h up to 1100° C. After that, microwave heating was performed in a manner similar to Example 4, and then the temperature was decreased to 1300° C. at a temperature decrease rate of 200° C./min. Thus, a zirconia sintered body of Example 10 was obtained. Here, the microwave heating conditions were changed such that the temperature was increased at 600° C./min up to 1050° C. and at 40° C./min up to 1730° C. and maintained at 1730° C. for one minute.

Example 11

The heating by microwaves in the production method according to Example 10 was changed to heating by an electric furnace. Specifically, the temperature of the calcined body was increased to 1500° C. at a rate of 120° C./h and after the temperature was kept for 120 minutes, the temperature was decreased at a rate of 5° C./min. Such a temperature decrease was performed by stopping the heating by the electric furnace and making the sintered body release heat naturally in the electric furnace. The operation other than this operation was performed similarly to Example 10 and thus, a zirconia sintered body of Example 11 was produced.

Example 12

The production method according to Example 10 was changed so that yttrium chloride was not mixed, ytterbium chloride was mixed, and the ytterbia concentration in the zirconia sintered body became 5.6 mol %. The temperature increase rate in the microwave heating was then changed to 600° C./min up to 1200° C., 5° C./min up to 1500° C., and 40° C./min up to 1730° C. and 1730° C. was kept for one minute. A zirconia sintered body of Example 12 was produced in a manner similar to Example 10 except what has been described above.

Example 13

The heating by microwaves in the production method according to Example 12 was changed to heating by an electric furnace. Specifically, the temperature of the calcined body was increased to 1500° C. at a rate of 120° C./h and after the temperature was kept for 120 minutes, the temperature was decreased at a rate of 5° C./min. Such a temperature decrease was performed by stopping the heating by the electric furnace and making the sintered body release heat naturally in the electric furnace. The operation other than this operation was performed similarly to Example 12 and thus, a zirconia sintered body of Example 13 was produced.

<Crystal Phase Analysis>

An X-ray diffraction pattern profile of the zirconia sintered body produced in each example was obtained using X' Pert Pro Alpha-1 (Malvern PaNalytical) as an X-ray diffraction device. The measurement conditions were as follows.

Line source: CuKα1 (45 kV, 40 mA)
Measurement range: $10° \leq 2\theta \leq 90°$
Scan speed: 1.5°/min
Step size: 0.0131°

The obtained XRD profile was subjected to Rietveld analysis using analysis software RIETAN-FP, so that the c/a axis length ratio of the unit lattice and the proportion (mass %) of the crystal phase were analyzed. The analysis was conducted assuming that the tetragonal crystal, the metastable tetragonal crystal, and the cubic crystal were mixed and the temperature parameters of the respective elements were the same. Note that the term metastable tetragonal crystal here refers to the crystal phase in which only the a-axis length and the c-axis length of the tetragonal crystal are different. The results are shown in Table 1.

<Evaluation of Translucency>

The zirconia sintered body produced in each example was processed into a 1 mm-thick disc-shaped test piece, both surfaces of the test piece were mirror-polished using a diamond slurry (average particle diameter 0.5 μm) as an abrasive, and the total light transmittance with respect to a D65 light source in the thickness direction was then measured. In such measurement, a haze meter NDH4000 manufactured by Nippon Denshoku Industries Co., Ltd. was used. The results are shown in Table 1.

<Hydrothermal Degradation Test>

In accordance with a method shown below, the monoclinic crystal ratio (%) of the zirconia sintered body produced in each example after the hydrothermal process was measured. Specifically, first, the surface of the zirconia sintered body was mirror-polished with the diamond slurry (average particle diameter 0.5 μm). Next, the polished sintered body was subjected to the hydrothermal degradation process at 140° C. for 100 hours using a device named high-pressure microreactor (manufactured by OMLABO). After that, the X-ray diffraction pattern of the polished surface was measured using an X-ray diffraction device (device name: Ultima IV, manufactured by Rigaku Corporation). Then, by using the measurement results, the monoclinic crystal ratio (%) was obtained in accordance with the following formula. As understood by the following formula, the monoclinic crystal ratio can be calculated based on X-ray diffraction peak intensity $[I_m (111)]$ corresponding to a monoclinic crystal phase (111) plane, X-ray diffraction peak intensity $[I_m (11\text{-}1)]$ corresponding to a monoclinic crystal phase (11-1) plane, and total X-ray diffraction peak intensity $[I_o (111)]$ corresponding to crystal phase (111) planes other than the monoclinic crystal phase. The results are shown in Table 1.

[Monoclinic crystal ratio (%)] =

$$\{I_m(111) + I_m(11-1)\}/\{I_m(111) + I_m(11-1) + I_o(111)\} \times 100$$

Note that each condition of the X-ray diffraction device is as follows.

Line source: CuKα (40 kV, 40 mA)

Measurement range: 26°≤2θ≤38°

Scan speed: 2.0°/min

Step size: 0.02°

TABLE 1

| | Sintering method | Proportion of yttria (mol %) | Proportion of ytterbia (mol %) | Alumina content (mass %) | Shape of zirconia before sintering | Temperature decrease rate to 1300° C. (° C./min) | Maximum sintering temperature (° C.) | Crystal phase (1 ≤ c/a < 1.0055) c/a axis length ratio | Proportion (mass %) |
|---|---|---|---|---|---|---|---|---|---|
| Example 1 | Microwave | 4.1 | 0 | 0.05 | Powder | 10 | 1730 | 1.005 | 41 |
| Example 2 | Microwave | 4.1 | 0 | 0.05 | Powder | 50 | 1730 | — | 0 |
| Example 3 | Microwave | 4.1 | 0 | 0.05 | Powder | 100 | 1730 | — | 0 |
| Example 4 | Microwave | 4.1 | 0 | 0.015 | Powder | 200 | 1730 | — | 0 |
| Example 5 | Microwave | 4.1 | 0 | 0 | Granules | 100 | 1730 | — | 0 |
| Example 6 | Microwave | 4.1 | 0 | 0.125 | Granules | 50 | 1620 | — | 0 |
| Example 7 | Microwave | 5.6 | 0 | 0.015 | Powder | 200 | 1730 | — | 0 |
| Example 8 | Electric furnace | 4.1 | 0 | 0.05 | Powder | 5 | 1450 | 1.004 | 37 |
| Example 9 | Electric furnace | 5.6 | 0 | 0.015 | Powder | 5 | 1450 | 1.004 | 70 |
| Example 10 | Microwave | 1.7 | 2.4 | 0.015 | Powder | 200 | 1730 | — | 0 |
| Example 11 | Electric furnace | 1.7 | 2.4 | 0.015 | Powder | 5 | 1500 | 1.005 | 40 |
| Example 12 | Microwave | 0 | 5.6 | 0.015 | Powder | 200 | 1730 | — | 0 |
| Example 13 | Electric furnace | 0 | 5.6 | 0.015 | Powder | 5 | 1500 | 1.005 | 75 |

| | Crystal phase (1.0055 ≤ c/a < 1.010) | | Crystal phase (1.012 < c/a ≤ 1.017) | | Total light transmittance (%) | monoclinic crystal ratio after hydrothermal degradation (%) |
|---|---|---|---|---|---|---|
| | c/a axis length ratio | Proportion (mass %) | c/a axis length ratio | Proportion (mass %) | | |
| Example 1 | — | 0 | 1.015 | 59 | 45.7 | 35.2 |
| Example 2 | 1.006 | 40 | 1.013 | 60 | 47.5 | 4.98 |
| Example 3 | 1.007 | 45 | 1.014 | 55 | 47.5 | 2.5 |
| Example 4 | 1.008 | 56 | 1.014 | 44 | 48.1 | 0.5 |
| Example 5 | 1.008 | 45 | 1.013 | 55 | 46 | 3 |
| Example 6 | 1.006 | 41 | 1.014 | 59 | 47.1 | 3.5 |
| Example 7 | 1.007 | 100 | — | 0 | 56.2 | 0.001 |
| Example 8 | — | 0 | 1.016 | 63 | 44.2 | 41.2 |
| Example 9 | — | 0 | 1.015 | 30 | 50 | 1.2 |
| Example 10 | 1.008 | 47 | 1.013 | 53 | 47.3 | 1.5 |
| Example 11 | — | 0 | 1.015 | 60 | 44.6 | 44.3 |
| Example 12 | 1.008 | 100 | — | 0 | 51 | 0.001 |
| Example 13 | — | 0 | 1.015 | 35 | 49.8 | 5.1 |

Comparing Examples 1 to 6 and 8 in which the proportion of yttria is 4.1 mol % indicates that the monoclinic crystal ratio after the hydrothermal degradation in Examples 2 to 6 is suppressed to 5% or less and thus, the excellent hydrothermal degradation resistance is achieved. The reason is considered as follows: by sintering by the microwave heating (here, 1620° C. or higher) and cooling to 1300° C. at a temperature decrease rate of at least 50° C./min or more, the proportion of the crystal phase in which the c/a axis length ratio of the unit lattice is 1.0055 or more and less than 1.010 is 40 mass % or more. In addition, it is also understood that the crystal phases of the zirconia sintered bodies according to Examples 2 to 6 include the crystal phase in which the c/a axis length ratio of the unit lattice is 1.0055 or more and less than 1.010 and the crystal phase in which the c/a axis length ratio of the unit lattice is more than 1.012 and 1.017 or less, and thus, the crystal phase with high homogeneity is achieved. On the other hand, in Examples 1 and 8, it is considered that since the temperature decrease rate is too slow, the crystal phase in which the c/a axis length ratio of the unit lattice is 1.0055 or more and less than 1.010 is not precipitated and the hydrothermal degradation resistance is insufficient. Furthermore, in Example 8, it is considered that since the zirconia sintered body is produced by the heating in the electric furnace, the translucency and the hydrothermal degradation resistance are inferior to those of the sintered body that is sintered by the microwave heating.

Comparing Examples 7 and 9 in which the proportion of yttria is 5.6 mol % indicates that the total light transmittance is higher and the monoclinic crystal ratio after the hydrothermal degradation is lower in Example 7. The reason is considered as follows: the microwave heating and the rapid cooling are performed in Example 7 and the proportion of the crystal phase in which the c/a axis length ratio of the unit lattice is 1.0055 or more and less than 1.010 is 100 mass %.

Example 10 is the example in which a part of yttria in Example 4 is changed to ytterbia and the excellent translucency and the excellent hydrothermal degradation are achieved. In Example 10, the zirconia sintered body is also formed of the crystal phase in which the c/a axis length ratio of the unit lattice is 1.0055 or more and less than 1.010 and the crystal phase in which the c/a axis length ratio of the unit lattice is more than 1.012 and 1.017 or less, and the proportion of the crystal phase in which the c/a axis length ratio of the unit lattice is 1.0055 or more and less than 1.010 is 40 mass % or more. On the other hand, Example 11 is the example in which the heating was performed by the electric furnace instead of the microwave heating, and the crystal phase in which the c/a axis length ratio of the unit lattice is 1.0055 or more and less than 1.010 was not observed. The reason is considered as follows: the entire heating space in the electric furnace is kept at high temperature and the temperature decrease rate after the sintering is so slow that the hydrothermal degradation resistance is insufficient.

In Examples 12 and 13, a zirconia sintered body containing ytterbia instead of yttria was produced. It is understood that even in the production of the zirconia sintered body containing ytterbia, the microwave heating and the rapid cooling generate the crystal phase in which the c/a axis length ratio of the unit lattice is 1.0055 or more and less than 1.010 and achieve the excellent translucency and the excellent hydrothermal degradation.

Test 2

(Line Analysis by FE-EPMA)

The zirconia sintered bodies according to Examples 2, 4, 7, and 8 were subjected to the line analysis by FE-EPMA (JXA-8530F, manufactured by JEOL Ltd.) and the yttrium intensity distribution was examined. The surface of the zirconia sintered body was mirror-polished and the line analysis was performed on the obtained surface. The conditions were as follows.

Detector: Y WDS detector PETH
Acceleration voltage: 15 kV
Irradiation current: $5 \times 10^{-8}$ A
Collection time: 500 ms
Magnification: 50000 times
Pixel size: 9.4 nm
Measurement points: 256
Measurement distance: 2400 nm After the obtained characteristic X-ray intensity data of yttrium was subjected to a smoothing process with an average of five points, the coefficient of variation in the characteristic X-ray intensity of yttrium was obtained. The coefficient of variation of each example is shown in Table 2. Note that the measurement region of the line analysis was set so as to pass the crystal interface of the zirconia sintered body at least once. In addition, FIG. 3 to FIG. 6 are graphs expressing the results of the line analysis in Example 2, Example 4, Example 7, and Example 8, respectively. These graphs indicate the characteristic X-ray intensity of yttrium along a vertical axis and the measurement distance along a horizontal axis.

[Table 2]

TABLE 2

| | Sintering method | Proportion of yttria (mol %) | Temperature decrease rate to 1300° C. (° C./min) | Coefficient of variation |
|---|---|---|---|---|
| Example 2 | Microwave | 4.1 | 50 | 0.035 |
| Example 4 | Microwave | 4.1 | 200 | 0.031 |
| Example 7 | Microwave | 5.6 | 200 | 0.017 |
| Example 8 | Electric furnace | 4.1 | 5 | 0.06 |

(Analysis by STEM-EDX)

The surfaces of the zirconia sintered bodies according to Examples 4, 7, and 8 were analyzed by STEM-EDX (JEM-ARM200F (HRP), manufactured by JEOL Ltd.). The conditions were as follows.

Figure 7:
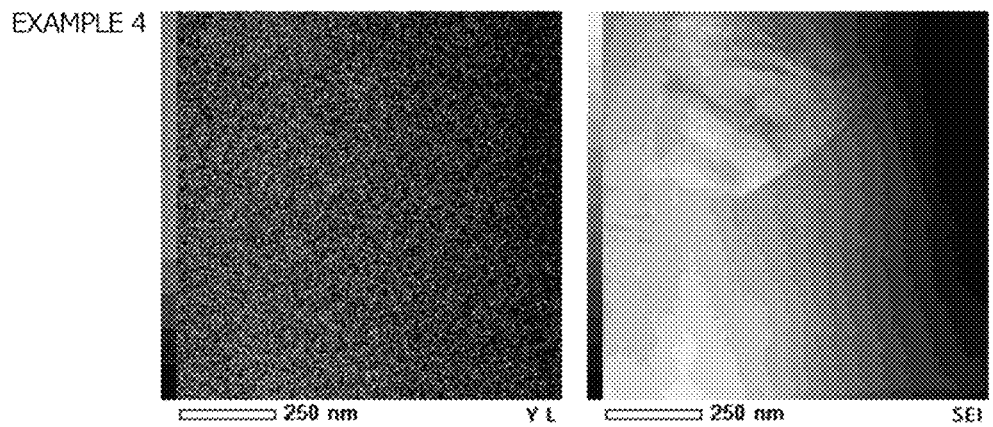
FIG. 7 shows a mapping image of yttrium on the surface of the zirconia sintered body of Example 4 (left side), and a secondary electron image thereof (right side).
Figure 8:
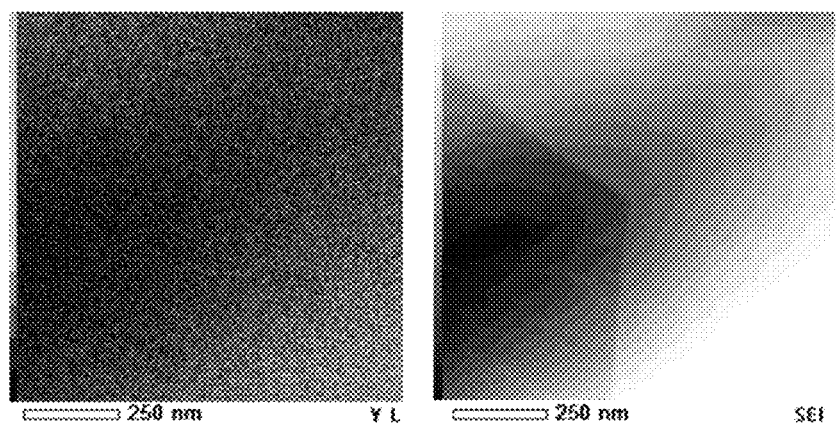
FIG. 8 shows a mapping image of yttrium on the surface of the zirconia sintered body of Example 7 (left side), and a secondary electron image thereof (right side).
Figure 9:
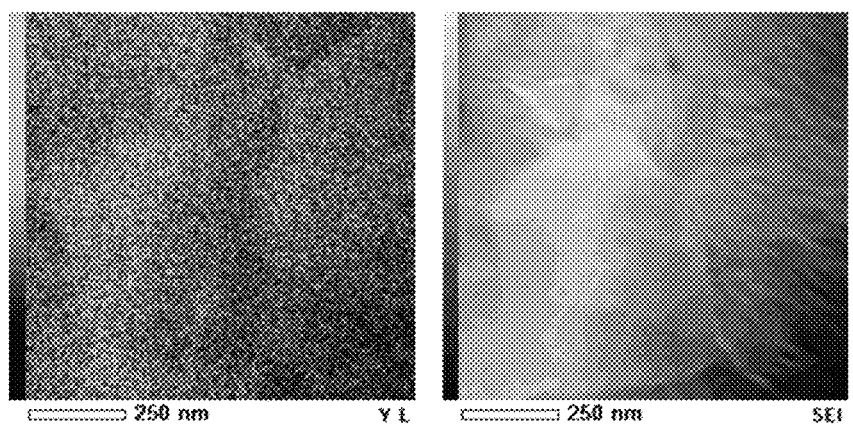
FIG. 9 shows a mapping image of yttrium on the surface of the zirconia sintered body of Example 8 (left side), and a secondary electron image thereof (right side).

Detector: EX-24221M1G5T
Acceleration voltage: 200 kV
Magnification: 200000 times
The number of times of sweeps: 150 times In each example, a mapping image of yttrium and a secondary electron image with the same field of view as the mapping image were acquired by STEM-EDX. FIG. 7 to FIG. 9 respectively show images of the zirconia sintered bodies according to Example 4, Example 7, and Example 8. In FIG. 7 to FIG. 9, the left side expresses the mapping image of yttrium and the right side expresses the secondary electron image. As the mapping image is brighter, the yttrium intensity is higher and as the mapping image is darker, the yttrium intensity is lower.

As shown in Table 2 and FIG. 3 to FIG. 6, the coefficient of variation in the characteristic X-ray intensity of yttrium was lower in the zirconia sintered body that was rapidly cooled after the sintering by the microwave heating than in the zirconia sintered body that was sintered in the electric furnace. That is to say, it is understood that yttrium is diffused more homogeneously (unevenness in concentration is suppressed) in the zirconia sintered body that is sintered with the microwaves.

As expressed in FIG. 9, in the case of sintering in the electric furnace, the yttrium intensity is locally high (segregated) at a boundary of the crystal particles observed in the secondary electron image. On the other hand, as expressed in FIG. 7 and FIG. 8, it is understood that the segregation of yttrium at the boundary of the crystal particles is suppressed in the zirconia sintered body that is rapidly cooled after the sintering with the microwave heating.

Hitherto, the specific examples of the technique that has been disclosed herein have been described in detail, but these are simply examples and do not limit the claims. In a technique to be described in the claims, a variety of transformations and modifications of the specific examples exemplified above are also included.

The invention claimed is:

1. A production method for a zirconia sintered body, the method comprising:
   a process body preparing step of preparing a process body containing zirconia and yttria and/or ytterbia, in which a total proportion of the yttria and the ytterbia is 4 mol % or more and 6 mol % or less when a total of the zirconia, the yttria, and the ytterbia is set to 100 mol %;
   a first heating step of heating the process body at 800° C. or higher and 1200° C. or lower;
   a second heating step of heating the process body after the first heating step at 1600° C. or higher and 2000° C. or lower by microwave heating; and
   a cooling step of decreasing a temperature of the process body after the second heating step to 1300° C. at a rate of 200° C./min or more, wherein
   in the second heating step, the microwave heating is performed in an atmosphere where an oxygen concentration is 30 vol % or more and 100 vol % or less.

2. The production method according to claim 1, wherein a heating method of the microwave heating is a multimode.

3. The production method according to claim 1, wherein in the second heating step, SiC susceptors are disposed so as to sandwich the process body from both sides in a predetermined direction.

4. The production method according to claim 1, wherein in the process body preparing step, the process body is prepared by forming granules containing zirconia.

* * * * *